US010145499B2

(12) United States Patent
Karoliussen

(10) Patent No.: US 10,145,499 B2
(45) Date of Patent: Dec. 4, 2018

(54) METALLIC FLANGE CONNECTION GASKET

(71) Applicant: OTECHOS AS, Tvedestrand (NO)

(72) Inventor: Hilberg Karoliussen, Risør (NO)

(73) Assignee: OTECHOS AS, Tvedestrand (NO)

( * ) Notice: Subject to any disclaimer, the term of this patent is extended or adjusted under 35 U.S.C. 154(b) by 211 days.

(21) Appl. No.: 15/021,176

(22) PCT Filed: Sep. 18, 2014

(86) PCT No.: PCT/NO2014/050170
§ 371 (c)(1),
(2) Date: Mar. 10, 2016

(87) PCT Pub. No.: WO2015/047100
PCT Pub. Date: Apr. 2, 2015

(65) Prior Publication Data
US 2016/0223111 A1 Aug. 4, 2016

(30) Foreign Application Priority Data
Sep. 26, 2013 (NO) .................................. 20131286

(51) Int. Cl.
F16L 23/20 (2006.01)
F16J 15/08 (2006.01)
F16L 23/18 (2006.01)

(52) U.S. Cl.
CPC ........... F16L 23/20 (2013.01); F16J 15/0806 (2013.01); F16J 15/0818 (2013.01);
(Continued)

(58) Field of Classification Search
CPC ...... F16J 15/08; F16J 15/0818; F16J 15/0881; F16J 15/0887; F16J 2015/085; F16J 2015/0862; F16L 23/18; F16L 23/20
See application file for complete search history.

(56) References Cited
U.S. PATENT DOCUMENTS
1,836,198 A * 12/1931 Spyer ...................... F16L 23/20
277/612
2,543,963 A * 3/1951 Gaffin ..................... F16L 23/20
277/640
(Continued)

FOREIGN PATENT DOCUMENTS
DE 814977 9/1951
DE 41 39 453 * 11/1991
(Continued)

OTHER PUBLICATIONS
Engilsh Language Abstract DE4139453, 1992.*

Primary Examiner — Nicholas L Foster
(74) Attorney, Agent, or Firm — Birch, Stewart, Kolasch & Birch, LLP

(57) ABSTRACT

A metallic flange connection gasket to be used for sealing between flanges on pipes or between attractable pipe flange and flange of an operational unit, e.g. pump or valve, the gasket exhibiting at least a pair of circling first ridges, the ridges thereof protruding from opposite faces of the gasket, right opposite to each other, and at least one first valley being adjacent a respective one of the first ridges and recessed in a respective face of the gasket. The gasket has mutually unitary portions consisting of a radially outer portion having a first thickness, a first, radially inner portion radially inwards of the outer portion, and a second, radially inner portion radially inwards of the first inner portion, the inner portions both exhibiting a second thickness being larger than the first thickness. At a transition between the radially outer portion and the first, radially inner portion, as well as at a radially inner end of the radially inner portion close to a radially inner circumference of the gasket there is provided with a second pair of oppositely located ridges and a third pair of oppositely located ridges, respectively. The at
(Continued)

least first pair of ridges constitutes a primary seal of the gasket, and the second and third pair of ridges constitute a secondary seal of the gasket.

20 Claims, 5 Drawing Sheets

(52) U.S. Cl.
CPC ....... *F16J 15/0825* (2013.01); *F16J 15/0887* (2013.01); *F16J 2015/0868* (2013.01)

(56) References Cited

U.S. PATENT DOCUMENTS

| | | | | |
|---|---|---|---|---|
| 3,167,320 | A * | 1/1965 | Kyle | B23K 20/00 |
| | | | | 174/361 |
| 4,109,923 | A | 8/1978 | Tückmantel | |
| 4,114,908 | A * | 9/1978 | Nicholson | F16J 15/0881 |
| | | | | 277/612 |
| 4,372,564 | A * | 2/1983 | Nicholson | F16J 15/0825 |
| | | | | 277/595 |
| 5,511,797 | A * | 4/1996 | Nikirk | F16J 15/125 |
| | | | | 277/609 |
| 6,186,513 | B1 | 2/2001 | Udagawa | |
| 6,290,237 | B1 * | 9/2001 | Graupner | F16L 23/18 |
| | | | | 277/603 |
| 6,994,356 | B2 * | 2/2006 | Veiga | F16J 15/061 |
| | | | | 277/616 |
| 2003/0062692 | A1 | 4/2003 | Diez et al. | |
| 2004/0118510 | A1 * | 6/2004 | Pollock | F16J 15/122 |
| | | | | 156/256 |
| 2005/0116427 | A1 * | 6/2005 | Seidel | F16J 15/0818 |
| | | | | 277/610 |
| 2005/0121859 | A1 * | 6/2005 | Seidel | F16J 15/061 |
| | | | | 277/628 |
| 2005/0206091 | A1 | 9/2005 | Detmann et al. | |
| 2008/0174075 | A1 | 7/2008 | Diez et al. | |
| 2015/0316150 | A1 * | 11/2015 | Zhao | F16J 15/0887 |
| | | | | 277/648 |
| 2015/0330509 | A1 * | 11/2015 | Malus | F16J 15/0887 |
| | | | | 277/608 |
| 2016/0348817 | A1 * | 12/2016 | Veiga | F16J 15/065 |
| 2017/0152973 | A1 * | 6/2017 | Kolb | F16L 23/18 |

FOREIGN PATENT DOCUMENTS

| | | |
|---|---|---|
| EP | 0 928 912 A1 | 7/1999 |
| EP | 1 298 365 A2 | 4/2003 |
| GB | 1166612 A | 10/1969 |
| GB | 1533404 A | 11/1978 |
| GB | 2 244 782 A | 12/1991 |
| JP | 3-209067 A | 9/1991 |
| JP | 10-9391 A | 1/1998 |
| JP | 11-108191 A | 4/1999 |
| JP | 11-201287 A | 7/1999 |
| JP | 2007-333065 A | 12/2007 |
| NO | 20111571 A1 | 5/2013 |
| SU | 1141254 A | 2/1985 |

* cited by examiner

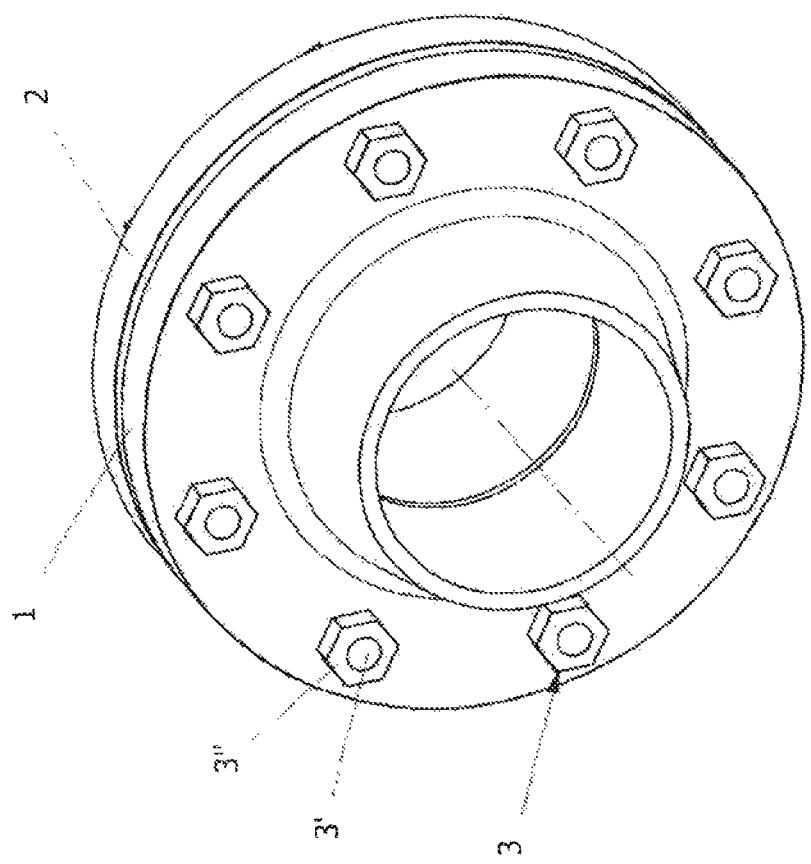

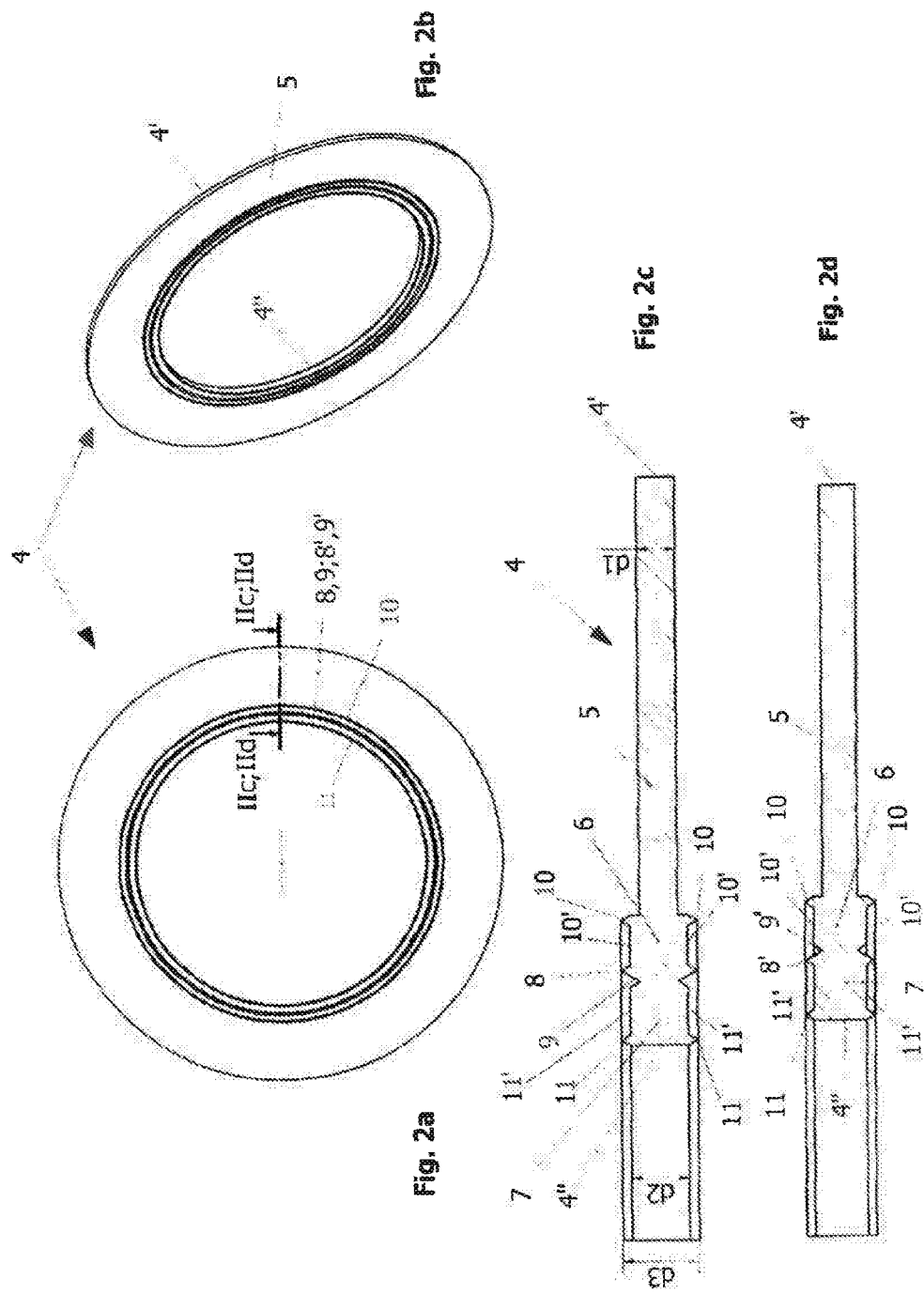

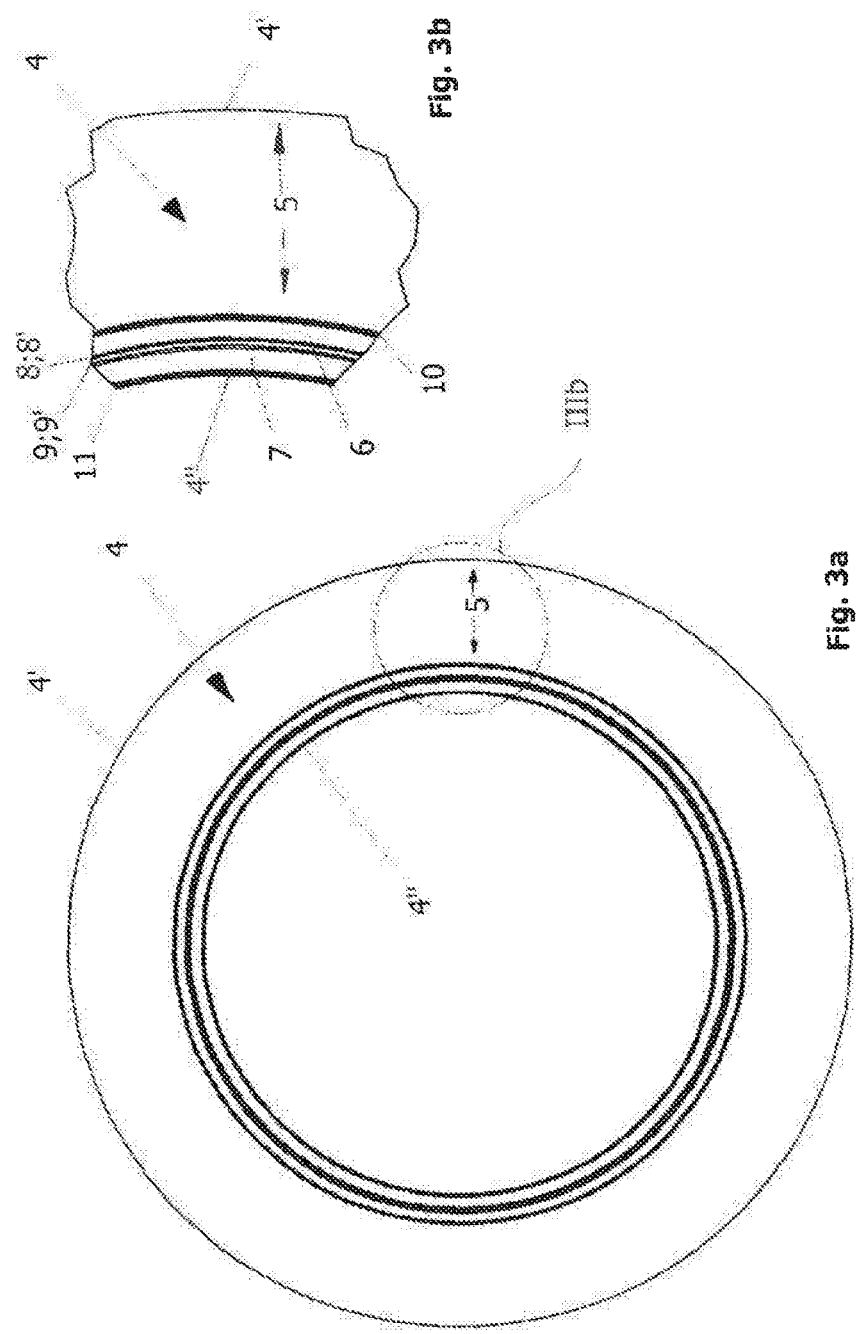

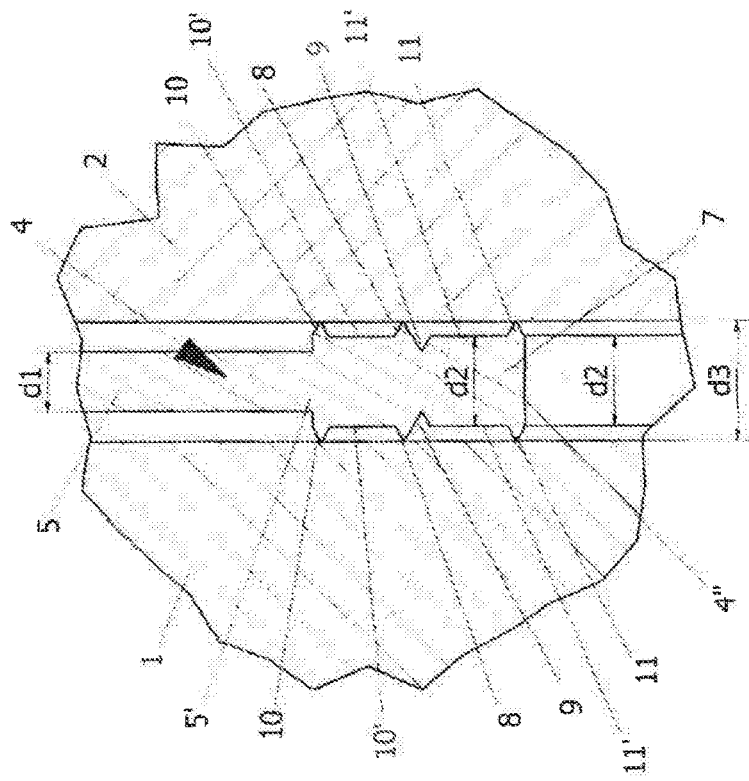
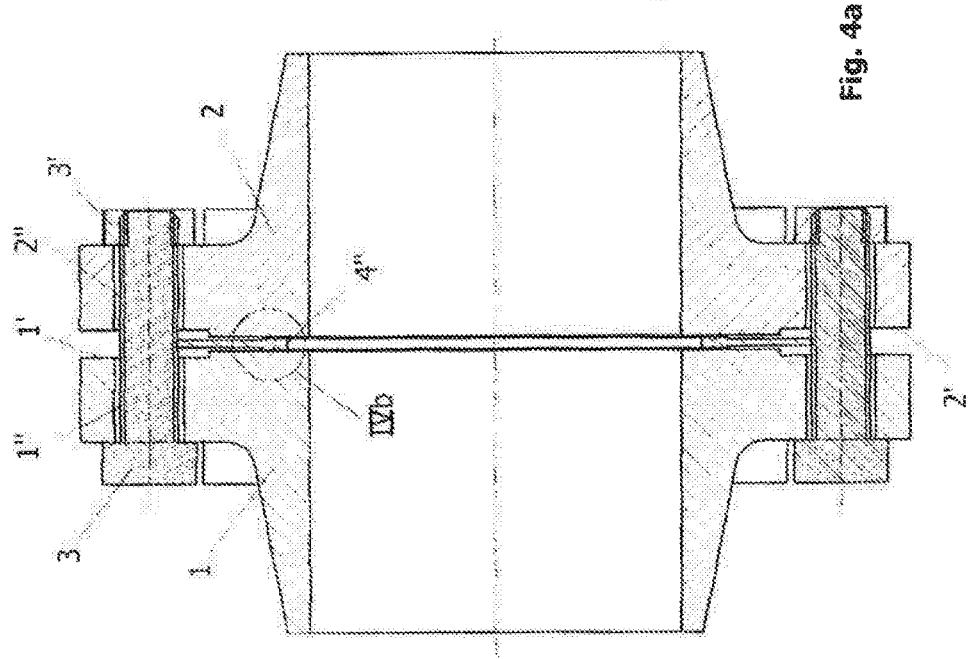
Fig. 4a
Fig. 4b

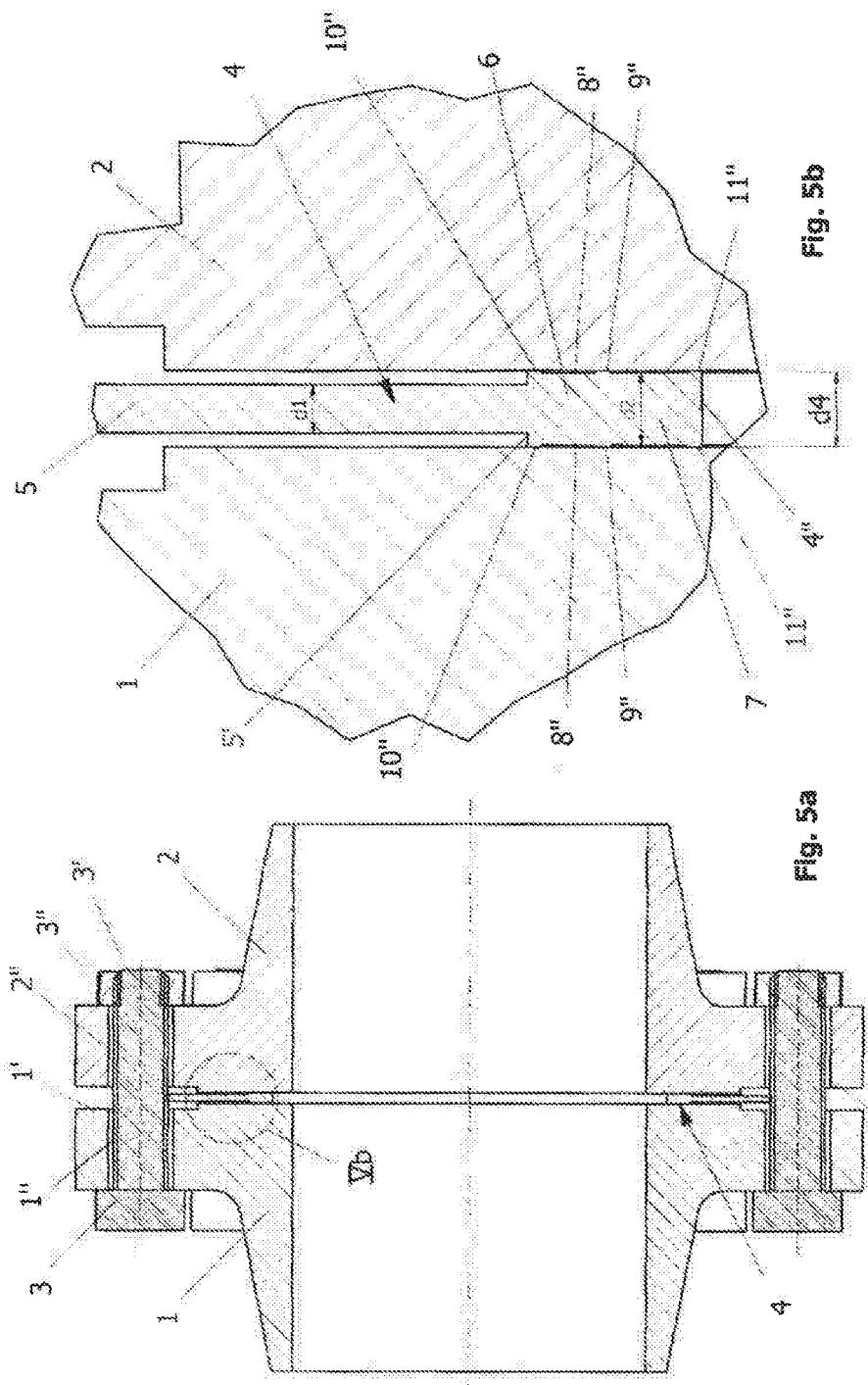

METALLIC FLANGE CONNECTION GASKET

BACKGROUND OF THE INVENTION

The present invention relates to metallic flange connection gasket to be located between opposite attractable flanges, the gasket on each of opposite faces thereof exhibiting at least one protruding, circling first ridge, and at least one first valley being adjacent the first ridge.

When two pipes having flanges, or a pipe having flange and a unit or element having a flange, e.g. pump and/or valve with flange, are to be interconnected, there is used gaskets of different types between the flanges in order to make certain that the flange connection becomes tight. There is frequently used gaskets of ductile material such as rubber, fiber composites and not so often metal gaskets having inlays of spun, graphite containing threads. In specific cases there is also used so-called RTJ-couplings where a ring of metal is pressed into grooves in the flanges.

All of the aforementioned types of gaskets have their advantages and disadvantages. Gaskets of ductile materials are cheap, but such materials will over time yield due to the pressure and the flange connection must be re-tightened in order to remain tight, and may therefore have a relatively short life. The types having spun, graphite containing threads are relatively expensive, but are able to tolerate quite high pressures and temperatures. Even these must be re-tightened, but the effect thereof is limited to a few times. RTJ couplings do not require any re-tightening, are quite stable and sustain high pressures and temperatures. These couplings require, however, specially processed flanges, and cannot replace other gaskets without replacement of the flanges. Leakages in flange connections can give serious consequences in connection with demanding applications. Leakages at gas plants and installations can result in fires and explosions, and there have been some negative, serious incidents caused by leakages in flange connections associated with such installations. For subsea pipes related to the oil and gas industry, such leakages may result in long-term pollutions before they are discovered, or result in acute, large leakages.

The following patent publications SU 1141254-A, U.S. Pat. No. 4,109,923-A and DE 814977-C1 are mentioned as other known, relevant technology. A less relevant gasket system is known from GB 2244782-A.

It is from Norwegian patent application 20111571 known a metallic flange connection gasket which has a homogenous material, with a ring-shaped or circular ridge region where the material easily can be caused to pass the flow limit upon the attracting the flanges towards each other, but where the flow moves towards an asymptote down towards the flow limit, because the material becomes larger in area as the force of attraction increases. That novel structure has, however, some technical deficiencies and has proved not to provide satisfactory sealing between flanges. These deficiencies are caused mainly by the material which is intended to yield has no adjacent space to flow or move into, and that the configuration does not take into sufficient consideration that flanges bend to a certain extent upon tightening of interconnection bolts. This results in that the faces of the flanges land on the gasket outside the region of sealing and will lift off from the sealing upon application of further force of attraction. Thus, the connection will experience a gradually increasing leakage upon an increased force of tightening on the bolt connection which is used to attract and interconnect the flanges.

OBJECT OF THE INVENTION

It is thus an object of the invention to provide a metallic flange connection gasket which is homogenous as regards its material, with circling shaped ridge region where the material can easily be caused to pass the yield limit upon application of the force of attraction and which overcomes the deficiencies which have proved to be present in the technical solution according to Norwegian Patent Application 20111571.

It is also important to take into consideration a corrosive environment, either present radially outside the gasket, e.g. adjacent sea water or other corrosive surroundings, or being adjacent a radially innermost region of the gasket, i.e. e.g. inside a pipeline.

SUMMARY OF THE INVENTION

According to the invention the metallic flange connection gasket is characterized in
that the gasket has:
  a radially outer portion with a first thickness,
  a first, radially inner portion radially inwards of the outer portion, and
  a second, radially inner portion radially inwards of the first inner portion, the inner portions both exhibiting a second thickness being larger than the first thickness,
that said at least one circling first ridge and said at least one adjacent first valley are located at a region associated with at least one of said inner portions,
that axially opposite located first ridges, i.e. on face of either side of the gasket, have in non-depressed state a first peak-to-peak distance, and have in a depressed state with the flanges pulled or attracted towards each other and with the gasket thereby in a flange sealing function, a second and smaller peak-to-peak distance, the first distance being larger than the second peak-to-peak distance, and the second thickness being smaller than the first distance and said second distance,
that the gasket on both opposite side faces thereof:
  radially outside the first ridge is configured with a second ridge to form a first recess between said first and second ridges, and
  radially inside the first ridge is configured with a third ridge to form a second recess between said first and third ridges,
  wherein the axially opposite located second and third ridges, i.e. on face on either side of the gasket, have in non-depressed state said first peak-to-peak distance.

Further embodiments appear from the attached sub-claims 2-9.

The invention is now to be described further with reference to the attached drawings showing non-limiting embodiments of the invention.

BRIEF DESCRIPTION OF THE DRAWINGS

FIG. 1 shows in perspective view and from one side an embodiment of a flange connection which incorporates the flange connection gasket, according to the invention.

FIG. 2a shows the flange connection gasket in plane view from one side, FIG. 2b shows in perspective view the flange connection gasket of the invention viewed from the opposite side, and FIGS. 2c and 2d show the sections IIc; IId-IIc; IId, respectively, FIG. 2c showing a first embodiment of the flange connection gasket, and FIG. 2d showing a second embodiment of the flange connection of the invention.

FIG. 3a shows the flange connection gasket in plane view, and FIG. 3b shows the section IIIb on FIG. 3a.

FIG. 4a shows flange connection in tensioned state before attraction the flanges towards each other has been made, and FIG. 4b shows the section IVb on FIG. 4a.

FIG. 5a shows the gasket on FIGS. 2a, 3a and 4a after the flanges have been attracted towards each other, and FIG. 5b shows the section Vb on FIG. 5a.

DETAILED DESCRIPTION OF THE DRAWINGS

On FIG. 1 there are shown two pipe flanges 1, 2 which are pulled or attracted towards each other by means of a plurality of flange connection locks 3, a total of eight in the shown example. Such locks 3 can, as in the case shown, consist of a bolt with a threaded end 3' and a nut 3", the bolt passing through holes 1", 2" in the flanges. It may be visualized the use of a greater or smaller number of such locks 3 dependent on diameter of the flanges. Upon turning of the nuts 3" on the threaded portion 3' of the bolt, the opposite faces 1', 2' of the flanges are brought closer to each other and to a tighter engagement with a gasket which abuts a portion of the respective faces. The flange connection gasket, according to the invention, is not visible on FIG. 1.

As shown on FIGS. 2a-5b, see in particular FIGS. 4a and 4b and FIGS. 5a and 5b, the gasket 4 has an outer circumference 4' and an inner circumference 4", a radial outer portion 5 having a first thickness d1, and a first radial inner portion 6 and a second radial inner portion 7 being radially inside the first portion 6, and where the portions 6 and 7 exhibit a second thickness or face-to-face distance d2, wherein d2>d1.

There is between the portions 6 and 7, see FIG. 2a-2c, outwards from opposite faces of the gasket 4, arranged at least one circling ridge 8 and with an adjacent first valley 9 radially inside the ridge 8. However, as shown on FIG. 2d, the first valley, here denoted by 9', can be located radially outside the first ridge, here denoted by 8'. It is also possible to visualize location of the first ridge 8; 8' and the first valley 9; 9' in such a way that they will be associated with at least one of the portions 6, 7. It may then be possible that the ridge and the valley are not located at a transition between the portions 6, 7, but only on one of the portions. If there is e.g. used two pairs of first ridges and valleys, then e.g. one ridge and valley may be located on the portion 6 and the other ridge and valley may be located on the portion 7.

Even though the gasket on FIGS. 2 and 3 has been shown with a circular configuration, this is not to be construed as to limit the invention, as the gasket in an alternative embodiment may have oval shape, e.g. the shape of an ellipse or a cone cross-section, adapted to the connection requirements which the configuration of the flanges is to satisfy. The term "circling" therefore represents other configurations than circular ones.

In a currently preferred embodiment, the first ridge 8; 8' is sharp-pointed, and the first valley 9; 9' is similarly sharp-pointed.

The first ridges 8; 8' on opposite side faces of the gasket 4 may protrude with a point angle in the range of 45-90°, typically 60°, and are located right opposite each other. In a corresponding fashion, the first valleys 9; 9' may have a point angle configuration which is equal to or less than the point angle of the first ridges.

The valley 9 is on FIGS. 2c, 4b, 5b shown radially on the inside of the protruding first ridge 8. However, the valley 9' may, as an alternative, be present radially on the outside of the first ridge 8', as shown on FIG. 2d.

The solution according to FIG. 2d may be suitable when the environments are less aggressive than the medium flowing through the coupling, whereas the solution on FIG. 2c may be best suitable when the environments are more aggressive than the medium flowing through a provided coupling. The purpose of a respective valley 9; 9' is to be able to receiving material coming from the ridge 8; 8' when it is deformed and "flows" as the flanges 1, 2 (see FIGS. 5a, 5b) are pressed together upon tensioning of the flange connection locks 3. Because the first ridge and the first valley have one side in common, that side will as the pressure on the ridge 8; 8' increases and thereby the deformation of the ridge 8; 8' increases, start to bulge outwards and into the valley 9; 9'. The sealing face 8" (see FIG. 5b) which created by the compacted ridge 8; 8' will steadily become wider until the ridge 8; 8' does not allow for more flow of material.

In order to prevent that corrosive fluid, e.g. liquid or liquid with particulate material, either on the outside 4' and/or on the inside 4" of the flange connection gasket 4, may come into contact with the first ridge 8; 8' which constitutes a primary seal and the adjacent valley 9; 9', the gasket 4 is at the transition 5' between the radially outer portion 5 and the first radially inner portion 6 configured with a second ridge 10 on each side face of the portion 6 of the gasket 4. Similarly, the gasket 4 is at a radially innermost end region of the second radially inner portion 7, i.e. at the inner circumference 4", configured with a third ridge 11 on each side face of the portion 7 of the gasket 4. The second ridges 10 and the third ridges 11 will constitute the secondary seals of the gasket.

The oppositely located first pairs ridges 8; 8' and said second and third pairs of ridges 10; 11, i.e. the ridges of the respective pair being on opposite faces of the gasket 4 and in axial direction thereof, have in a non-depressed state a first peak-to-peak distance d3 and have in a depressed state with the flanges 1, 2 pulled towards each other and with the gasket thereby in a flange sealing function (see FIGS. 5a and 5b), a respective smaller peak-to-peak distance. For the first ridges 8; 8' this smaller peak-to-peak distance is substantially d4. A similar smaller peak-to-peak distance of the second and third pairs of ridges 10; 11 may also be substantially equal to d4 or have a value being less than d3. In any case d2<d3 and d3>d4.

As with most flange gaskets, the outer portion 5 of the gasket 4 lies with the outer circumference 4' of the gasket against an inwards facing side of the bolts 3. However, there may be available types of gaskets having same diameter as the flanges and with a plurality of holes for bolts 3 to pass through. Even though this is also possible with the gasket according to the invention, the currently preferred embodiment of the gasket has a largest diameter corresponding to the smallest distance between radially and oppositely located flange bolts 3.

FIG. 5b shows the shape of the gasket 4 after tensioning of the bolt-and-nut connections 3. In such a situation the flanges 1, 2 may be inclined towards each other by a small, acute angle, e.g. in the range 1-10°, e.g. 1-5°.

It is readily observed that the stepping-down from the thickness d2 of the portion 6 out towards the thickness d1 of the radially outermost portion 5 has a specific function. Without such stepping-down from d2 to d1, the flanges 1, 2 and the outer edge 4' of the gasket 4 would have made contact early during the pressing together of the flanges, i.e. during the tightening of the locks or bolt-and-nut connections 3, and to the extent the material of the first ridges 8; 8' had started to yield and flow, this would have ceased. Upon further tightening of the locks or bolt-and-nut connections 3, the sealing face between the deformation 8″ of the ridges 8; 8' and the faces 1'; 2' of the flanges would have lost the pre-tensioning from the locks or bolt-and-nut connections 3 and the flanges 1; 2, and in the worst case have lifted away from each other.

The stepping-down from d2 to d1 prevents such loss of pre-tensioning, and the pressure at the sealing faces 8″; 1' and 8″; 2' becomes a function of spring effect force provided by the flanges 1, 2 and the bolt-and-nut based locks which can be tightened. The second and third ridges 10; 11 will, however, upon tightening of the locks 3, similar to the first ridges 8; 8' also form metal-into-metal engagement with the flange faces 1'; 2'. Said second and third ridges 10; 11 will thereby, together with the first ridges 8; 8' on each side face of the gasket 4 at the portions 6, 7 form a circling abutment against the flange face at three radially separate locations. This will yield not only a more stable region of compression at the portions 6, 7 caused by tightening of the bolt-and-nut type locks 3, but the ridges 10, 11 will upon tightening also cause the requirement of larger tensioning forces on the bolt-and-nut type locks 3 that what the case would have been if the first and second ridges 10; 11 had not been present.

The second and third ridges 10; 11, which form secondary seals, may optionally have the same pointed configuration as the first ridges 8; 8'. It will be noted From FIG. 4b that the gasket faces of the portions 6, 7 have mutual distance d2 (being the thickness of those portions) which is less than the distance d3 (being also the peak-to-peak distance of a ridge pair) between the flange faces 1'; 2' before force of attraction is applied thereon, in such a way that when the ridges 10; 11 have their height reduced (i.e. their protrusion from faces of the portions 6, 7), then some their compressed material may move to an adjacent first recess 10' and an adjacent second recess 11', respectively, each recess having a depth (d3−d2)/2 before tightening of the bolt-and-nut connection 3.

It will hereby be appreciated that the first ridges 8; 8' will constitute the primary metal-into-metal seal, whereas said second and third ridges 10; 11, which constitute secondary seals, will prevent that corrosive environment enters into contact with the first ridges 8; 8' which constitute a primary seal of the gasket 4, as well as the valleys 9, 9'. This is important, because with in particular the metal swaging taking place at the ridges 8; 8' and the displacement of material thereby taking place towards the valleys 9; 9', there may possibly occur a minor structural or metallurgical change of the metal, thereby causing it to be more easily vulnerable to attack from a corrosive environment. By using the secondary seals in the form of said second and third ridges 10; 11, such disadvantageous effect is avoided.

Simultaneously, said second and third ridges 10; 11 will cause the gasket to provide additional sealing and also cause that the first ridges 8; 8' and the adjacent valleys 9; 9' cannot be compressed or swaged more than required.

Contrary to the gaskets mentioned in the introduction, the gasket according to the invention will not be affected to any extent worth mentioning by large temperature changes, because it is not of a ductile material.

It will be appreciated from the description that the first ridges 8; 8', upon pulling of the flanges 1; 2 towards each other by means of the bolt-and-nut type locks 3 which are tightened, may penetrate into the faces 1'; 2' of the flanges 1; 2 if they have a hardness which is greater than that of the flange material. They will at the same time also be partly deformed, in particular the top portion of the ridges. A corresponding effect is also valid for said second and third valleys 10; 11.

The ridges 8; 8' and 10; 11 are thus able to form a metal-into-metal seal, as the materials of the ridges 8; 8' and 10; 11 "flow" to a certain extent into the flanges 1; 2, and thereby engage upon the tightening of the flange connection. The excess material which is hereby created may be housed by the adjacent valleys 9; 9' as regard the ridges 8; 8', and the recesses 10'; 11' as regards the ridges 10; 11.

The gasket 4 does not require any preparation of the flanges and can thereby quite well replace existing gaskets or gaskets in previously installed flange connections.

The gasket of the invention has been non-publically laboratory tested over a time period with a flange connection submerged in a water container with pressurized helium as a medium through the flange connection, and was found completely tight.

Although there is on the drawings shown only one first ridge 8; 8' and one first valley 9; 9' on either side of the gasket 4, it will be appreciated that there may on each side of the gasket 4, in addition to said second and third ridges 10; 11 which are also present on both sides of the gasket, be present two or more primary sealant forming ridges 8; 8' with associated valleys 9; 9'.

With a plurality of first ridges 8; 8' and valleys 9; 9' on each side face of the gasket 4, the respective first valleys can e.g. lie on the same radial side of the associated ridge. It is also possible to visualize that a first valley which is associated with a first ridge may be radially outside, i.e. on that side of the first ridge which faces the outer circumference 4', whereas another first valley associated with another first ridge may be radially inside, i.e. on that side of the first ridge which faces the inner circumference 4″. In this case of two first ridges, these would in such a case be adjacent. In an alternative thereof, a first valley which is associated with a first ridge may be radially inside, i.e. on the side of the first ridge which faces the inner circumference 4″, whereas another first valley associated with another first ridge may be radially outside, i.e. on that side of such first ridge which faces the outer circumference 4'. In that case of two first ridges, their respective valleys would be adjacent.

The currently preferred embodiment will be one first pair of ridges 8; 8' on opposite faces of the gasket and with an associated valley 9; 9' as shown and described. In any case, said second and third pairs of ridges 10; 11 will in addition be used.

The flange connection gasket, according to the invention, will normally be made from the same material as the flanges, or from a material which is very close in the galvanic electro-chemical series, in particular where there is present electrolytic substance or medium used in the surrounding milieu or in the pipelines which are attached to the flanges. This will prevent galvanic corrosion. The gasket has also the advantage that it is 100% recyclable because it is homogenous.

In the case that two flanges to be joined are made from different materials, e.g. bronze and acid-proof steel, respectively, a situation which may occur using valves and/or pumps, the election of gasket material should be made based on the one of the flange materials having the greatest hardness.

The gasket may, according to the invention, normally be usable for most flange materials, but an exception may be brittle materials, e.g. castings, where engagement from the ridges 8; 8' and 10, 11 could cause formation of cracks or stress concentrations.

The invention claimed is:

1. A metallic flange connection gasket to be located between opposite flanges, the gasket comprising:
    two opposite faces, each having at least one protruding circling first ridge adjacent to at least one first valley thereon;
    a radially outer portion with a first thickness;
    a first radially inner portion radially inwards of the outer portion; and
    a second radially inner portion radially inwards of the first radially inner portion, the first and second radially inner portions each having a second thickness larger than the first thickness,
    wherein said at least one circling first ridge and said at least one first valley are located at a region associated with at least one of said radially inner portions,
    wherein the first ridges are axially opposite and aligned with each other, each first ridge having a peak such that in an uninstalled state of the gasket there is a first peak-to-peak distance between the respective first peaks, and wherein the gasket is configured in such a manner that in an installed state, with the gasket installed between the flanges for providing sealing therebetween, there is a second peak-to-peak distance between the respective first peaks and smaller than the first peak-to-peak distance, and the second thickness being smaller than the first peak-to-peak distance and being configured to be smaller than said second peak-to-peak distance,
    wherein each opposite face has a second ridge radially outside of the first ridge, has a third ridge radially inside of the first ridge, has a first recess between the first and second ridges, and has a second recess between the first and third ridges,
    wherein each of the second and third ridges has a peak,
    wherein the second ridges are axially opposite and aligned with each other, and the third ridges are axially opposite and aligned with each other,
    wherein, in the uninstalled state, a distance between the peak of each second ridge and a distance between the peak of each third ridge are equal to the first peak-to-peak distance,
    wherein the first valley on each opposite face is adjacent to the first or the second recess on the same opposite face, and
    wherein each first valley is recedes axially deeper than the respective first or second recess adjacent thereto.

2. The metallic flange connection gasket of claim 1,
    wherein the second ridge is located at a transition between the radially outer portion and the first, radially inner portion, and
    wherein the third ridge is located at an end of the second, radially inner portion close to a radially inner circumference of the gasket.

3. The metallic flange connection gasket of claim 1, wherein the at least one first valley is located on the gasket radially inside the first ridge.

4. The metallic flange connection gasket of claim 1, wherein the at least one first valley is located on the gasket radially outside the first ridge.

5. The metallic flange connection gasket of claim 1, wherein the first ridge and the first valley are pointed in the uninstalled state of the gasket.

6. The metallic flange connection gasket of claim 1, wherein said second and third ridges are pointed in the uninstalled state of the gasket.

7. The metallic flange connection gasket of claim 1, wherein the gasket is made of a material configured to be the same as a material of the flanges that the gasket is to be installed with, or a material having a hardness configured to be equal to or close to a hardness of the material of the flanges that the gasket is to be installed with, and wherein the material of the gasket is configured to be in neighboring or same galvanic electro-chemical series as the material of the flanges.

8. The metallic flange connection gasket of claim 1, wherein the gasket is made of a material configured to be the same as a material of a hardest one of materials of the flanges that the gasket is to be installed with, or a material having a hardness configured to be equal to or close to a hardness of the material of the hardest one of materials of the flanges that the gasket is to be installed with.

9. The metallic flange connection gasket according to claim 1, wherein the first ridges are opposite one another and exactly aligned, the second ridges are opposite one another and exactly aligned, and the third ridges are opposite one another and exactly aligned.

10. The metallic flange connection gasket of claim 2, wherein the at least one first valley is located on the gasket radially inside the first ridge.

11. The metallic flange connection gasket of claim 2, wherein the at least one first valley is located on the gasket radially outside the first ridge.

12. The metallic flange connection gasket of claim 2, wherein the first ridge and the first valley are pointed in the uninstalled state of the gasket.

13. The metallic flange connection gasket of claim 3, wherein the first ridge and the first valley are pointed in the uninstalled state of the gasket.

14. The metallic flange connection gasket of claim 4, wherein the first ridge and the first valley are pointed in the uninstalled state of the gasket.

15. The metallic flange connection gasket of claim 2, wherein said second and third ridges are pointed in the uninstalled state of the gasket.

16. The metallic flange connection gasket of claim 3, wherein said second and third ridges are pointed in the uninstalled state of the gasket.

17. The metallic flange connection gasket of claim 4, wherein said second and third ridges are pointed in the uninstalled state of the gasket.

18. The metallic flange connection gasket of claim 5, wherein said second and third ridges are pointed in the uninstalled state of the gasket.

19. The metallic flange connection gasket of claim 2, wherein the gasket is made of a material configured to be the same as a material of the flanges that the gasket is to be installed with, or a material having a hardness configured to be equal to or close to a hardness of the material of the flanges that the gasket is to be installed with, and wherein the material of the gasket is configured to be in neighboring or same galvanic electro-chemical series as the material of the flanges.

20. The metallic flange connection gasket of claim 3, wherein the gasket is made of a material configured to be the same as a material of the flanges that the gasket is to be installed with, or a material having a hardness configured to be equal to or close to a hardness of the material of the flanges that the gasket is to be installed with, and wherein the material of the gasket is configured to be in neighboring or same galvanic electro-chemical series as the material of the flanges.

* * * * *